United States Patent [19]

Kasiewicz et al.

[11] 4,150,299
[45] Apr. 17, 1979

[54] LEVEL SENSOR FOR AN AIR-SPRING SHOCK ABSORBER

[76] Inventors: Stanley J. Kasiewicz, 29852 Springhill Dr., Southfield, Mich. 48076; James R. Van Sickle, 48052 Mallard, New Baltimore, Mich. 48047

[21] Appl. No.: 860,020

[22] Filed: Dec. 12, 1977

[51] Int. Cl.$^2$ .......................................... G01N 21/30
[52] U.S. Cl. ................................. 250/561; 250/231 P
[58] Field of Search ............... 280/17; 250/231 P, 561, 250/560, 239

[56] References Cited

U.S. PATENT DOCUMENTS 3,906,240   9/1975   Jeffree ................................. 250/561

*Primary Examiner*—M. Tokar
*Attorney, Agent, or Firm*—Reising, Ethington, Barnard

[57] ABSTRACT

A level sensor for an air-spring shock absorber is sensitive to the axle-to-body distance of the vehicle on which the shock absorber is mounted. The level sensor comprises a thin support plate formed of resilient material that may be deformed to fit within the shock absorber in conformity with the shape of the inner surface of the tubular member defining the air spring. The support plate has an LED mounted on one end, and first and second photoresistors mounted at the other end in spaced relation to one another; the first and second photoresistors representing the upper and lower limits of permissible axle-to-body distance, respectively. Light communication between the LED and photoresistors is established or interrupted by the absence or interposition of a fluid reserve tube therebetween. A connector head is integrally formed with the support plate and is insertable through a hole in the tubular body defining the air chamber to secure the sensor in position.

7 Claims, 4 Drawing Figures

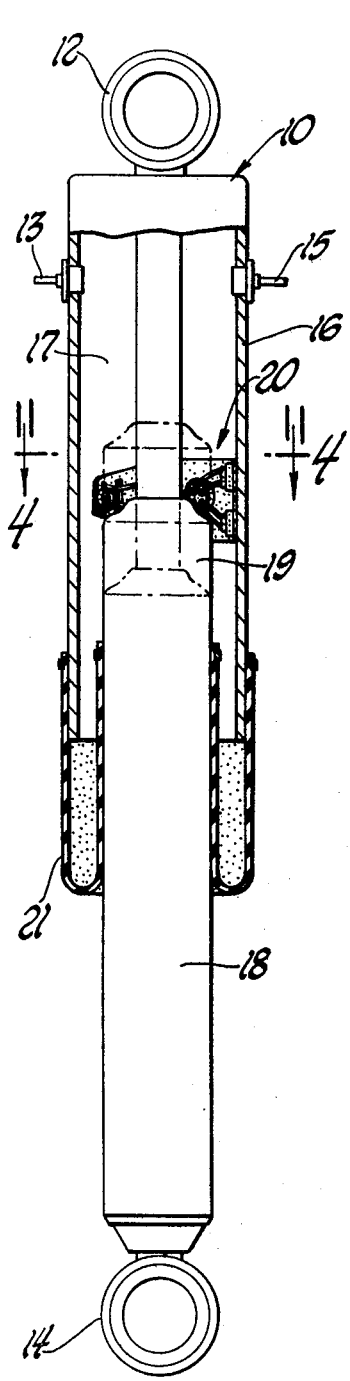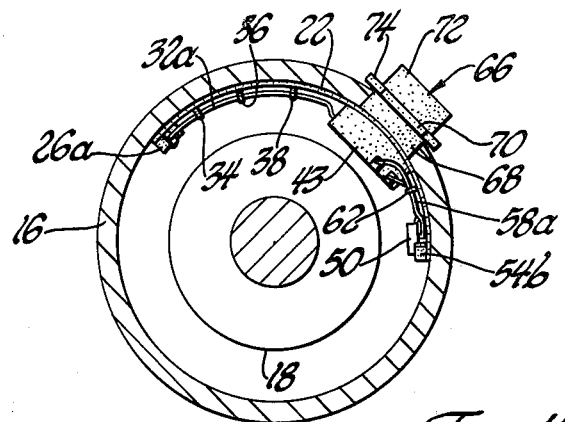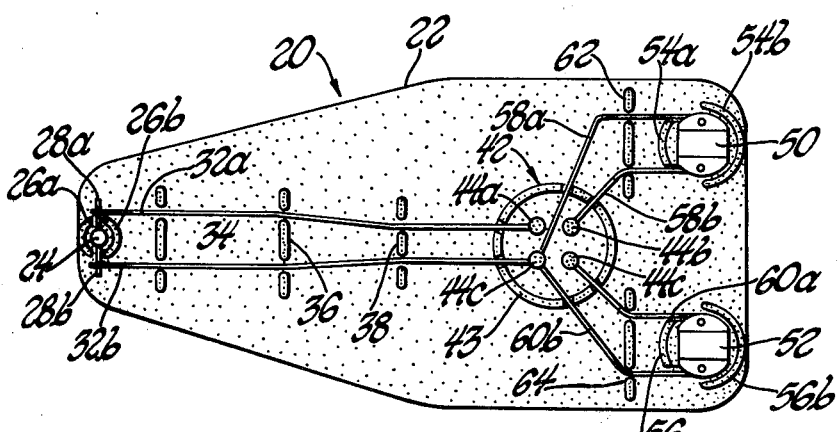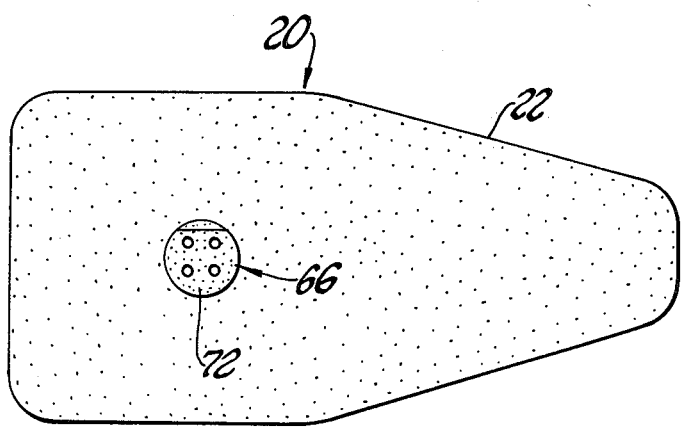

LEVEL SENSOR FOR AN AIR-SPRING SHOCK ABSORBER

CROSS REFERENCE TO RELATED APPLICATION

This application is related to a co-pending application entitled Control Circuit for Load-Leveling Shock Absorbers, filed on even date herewith by Stanley J. Kasiewicz, Ser. No. 860,020.

BACKGROUND OF THE INVENTION

1. Field of the Invention

The present invention relates to vehicular load-leveling devices, and more particularly to a level sensor used in conjunction with such load-leveling devices to maintain proper vehicle attitude.

2. Description of the Prior Art

Load-leveling devices are used to maintain the proper attitude of a vehicle subjected to various loading conditions. Improper vehicle attitude can affect many important operating parameters, including, for example, bumper height, rear vision, forward lighting and overall ride quality. The conventional measure of vehicle attitude is the axle-to-body distance, i.e. the distance from the axle to a fixed reference point on the frame. This measure must be kept within a permissible range of values to assure proper vehicle operation.

An air-spring shock absorber is a vehicle load leveling device that can be adjusted to accommodate various load conditions. The shock absorber is generally mounted with one end fixed to the axle and the other end fixed to the vehicle frame. It comprises a closed tubular member carrying a piston-cylinder arrangement for the damping out of road distrubances. The outer end of the closed tubular member contains an air volume which is pressurized by an air pump. A change in air pressure will cause a corresponding change in air volume, which in turn can be translated into a change in axle-to-body distance.

To maintain the axle-to-body distance within a permissible range of values, a transducer is needed to monitor the positional relationship of a reference point on the frame with respect to the axle. One means of accomplishing this is to sense the variations in the relative position of a point on the piston-cylinder arrangement along the axial dimension of the closed tubular member.

However, there are basic design problems associated with providing a position sensor within the volume defining the air spring. Most fundamental, is the need to maintain the integrity of the pneumatic seal within the closed tubular member to preserve the pressurization. A second problem is the need for a sensor of high durability to withstand the vibration and disturbances experienced within the environment of the shock absorber. A third consideration is the need for the sensor to be readily adaptable to the various types of production shock absorbers. Moreover, the sensor must be reasonably easy to manufacture and low in cost to be commerically feasible.

The patent to Wallace, U.S. Pat. No. 3,269,685 discloses a level sensor for use in conjunction with a hydraulic load-leveling device. The sensor comprises a pair of mutually perpendicular tracks or grooves in the wall of the load-leveling device. Each track or groove has a ball disposed for free motion between two extreme positions. The position of the ball is responsive to the orientation or position of the associated track. If the ball reaches too extreme a position away from the center of the track it will interrupt a beam-of-light (BOL) sensor providing a signal indicative of the misorientation or mispositioning of the load-leveling device.

The relatively complex mechanical character of the Wallace sensor limits its suitability for use within a load-leveling shock absorber. More specifically, it does not appear to have the needed durability or reliability. In addition, it would be costly to manufacture and difficult to equip on a production model shock absorber.

The patent to kirschner et al, U.S. Pat. No. 3,871,682 discloses another sensor for use in conjunction with a load-leveling device. The Kirschner et al sensor employs a light source and first and second photoresistors. The first and second photoresistors define the upper and lower bounds of permissible axle-to-body distance. However, the Kirschner sensor has a light source and photoresistor which are mounted on the vehicle body and a light filtering element is mounted by an arm on the axle to move between the source and the photoresistor The patent to Jackson, U.S. Pat. No. 3,606,375, discloses a mechanical level-sensor for an air-spring shock absorber. The Jackson sensor employs a pivotal sensor arm that monitors the position of a relatively movable member. The sensor arm actuates a pair of switches through a camming arrangement. The Jackson sensor employs complex mechanical structure and requires extensive modification of the tubular member defining the air-spring.

Other prior art devices, including those taught in Hagwood, U.S. Pat. No. 3,525,512; Wanner, U.S. Pat. No. 3,666,287; Jackson, U.S. Pat. No. 3,372,919; and Elliott et al, U.S. Pat. No. 3,575,442, are similarly attended by the same disadvantages of cost and complexity as those sensor devices previously discussed It is a principal objective of the present invention to provide a level sensor for use in conjunction with a load-leveling shock absorber that overcomes the limitations of the prior art. More specifically, the level sensor should be functional in a pneumatic or hydraulic device, have good durability and reliability, and be reasonably inexpensive to manufacture.

BRIEF SUMMARY OF THE INVENTION

The present invention is a level sensor that is responsive to changes in vehicle attitude relative to a permissible range of vehicle axle-to-body distance.

The sensor of the present invention is well adapted for use in a conventional air-spring shock absorber. The sensor is formed on a resilient or flexible support plate. The support plate is dimensioned to fit under stress in conformity with the interior wall of the closed tubular member defining the air spring. At one extreme end of the support plate is a light source, preferably an LED. At the other extreme end of the support plate are first and second photosensors, preferably photoresistors, mounted in spaced vertical relation with respect to one another. The first and second photosensors define the upper and lower limits of permissible axle-to-body distance.

The light source and first and second photosensors are in electrical communication with the environment external of the shock absorber through an integral connector head that is formed on the opposite side of the support plate. The connector head is inserted through a bore in the wall of the closed tubular member. The integrity of the pneumatic seal is maintained by the secure engagement of the connector head with the closed tubular member.

The sensor is responsive to the relative vertical position of the piston-cylinder arrangement within the closed tubular member. In the embodiment to be hereinafter disclosed, the fluid reserve tube of the shock absorber is used in the manner of a shutter to interrupt light communication between the light source and photosensors. More precisely, the absence of the fluid reserve tube in the paths between the light source and first and second sensors represents an underloaded condition, i.e. too large an axle-to-body distance. The interruption of both light paths between the light source and first and second photosensors represents an overloaded condition, i.e. too small an axle-to-body distance. The desired condition is the interruption of the light path between the source and first photosensor, and the establishment of the light path between the source and the second photosensor; this indicates that the shock absorber is loaded within the permissible range of axle-to-body distance.

Other modifications, advantages and features of the invention will become apparent upon a reading of the following detailed description of a specific embodiment.

BRIEF DESCRIPTION OF THE DRAWINGS

FIG. 1 is an elevational view of an air-spring shock absorber, in partial section, that is equipped with a level sensor of the present invention;

FIG. 2 is a diagrammatic view of the front surface of the level sensor of the present invention;

FIG. 3 is a diagrammatic view of the rear surface of the level sensor of the present invention; and FIG. 4 is a cross-sectional view of the shock absorber of FIG. 1 taken along line 4—4, illustrating the manner in which the level sensor of the present invention is mounted in the shock absorber.

DETAILED DESCRIPTION OF A SPECIFIC EMBODIMENT

An air-spring shock absorber representative of the type of load-leveling device for which the present invention is suited, is shown generally at 10 in FIG. 1. The shock absorber 10 is mounted on a vehicle by affixing one end to the vehicle frame by means of annular flange 12, and the other end to the vehicle axle by means of annular flange 14. The air-spring shock absorber 10 provides the combined functions of damping out transient road disturbances, along with providing means for adjusting the vehicle attitude to adapt to differing load conditions.

The construction of the air-spring shock absorber 10 broadly takes the form of a conventional piston-cylinder arrangement that provides the force damping effect, and a closed tubular casing 16 including a flexible sealing boot 21 defining the air-spring. The air-spring effect is obtained by admitting air under pressure into the closed volume 17 within the tubular casing 16. The shock absorber 10 is generally provided with an inlet valve 13 for the admission of air, and an outlet valve 15 for the release of air. At the lower portion of the volume within the tubular casing 16 is a fluid reserve tube 19 whose relative position within the tubular casing 16 is important for purposes of determining proper loading of the shock absorber 10, as will hereinafter be explained in greater detail.

A level sensor 20 is shown mounted on the interior wall of the tubular casing 16. The function of the level sensor 20 is to indicate the axle-to-body distance relative to a permissible range of values for the vehicle on which the shock absorber 10 is mounted.

Referring now to FIG. 2, the front surface of the level sensor 20 is shown in great detail. The sensor components are mounted on a relatively flexible support plate 22, which in the preferred embodiment is formed of molded nylon. The end-to-end length of the support plate 22 (which will hereinafter be referred to as its length in the lateral dimension) may be either greater than or less than one-half of the internal circumference of the tubular casing 16 wherein which it is mounted, for reasons that will presently become apparent. In the disclosed form, the support plate has a lateral dimension less than one-half the circumference.

A light source 24 is mounted at one extreme end of the support plate 22. In the preferred embodiment the light source 24 is a light emitting diode (LED) with one millicandela (mcd) output at 20 milliamp (ma) and 6600 angstroms (visible red) wavelength. A device meeting these specifications is commercially available from Monsanto and is identified as type MZ54. The light source 24 is contained within a pair of reversely similar symmetrical walls 26a and b which are integrally formed with the support plate 22.

The light source 24 is energized through two terminal leads 28a and b. The terminal leads are communicated to a bus, indicated generally at 42, through two respective connector leads 32a and b.

The function of the bus 42 is to communicate the electrical components of the sensor 20 with the environment external of the shock absorber. The bus 42 comprises four terminals 44a, b, c and d. The bus is bounded by a plurality of integral, arcuate wall sections, as represented by section 43. Spaces between adjaent wall sections provide a path for connector leads.

Connector leads 32a and b are secured in position by three sets of heat stakes 34, 36 and 38. Each set of heat stakes is defined by three vertically aligned upstanding members. The connector leads 32a and b are guided through the spaces between the members. When the leads are in position, heat is applied to the heat stakes, as by example of a soldering tip, to cause them to fuse together and secure the connector leads in position.

A pair of photosensors 50 and 52 are mounted on the support plate 22 at the end opposite the light source 24 and in vertical spaced relation to one another. As will hereinafter become apparent, the upper photosensor 50 will have correspondence to a lower limit of permissible axle-to-body distance, and the lower photosensor 52 will have correspondence to an upper limit of permissible axle-to-body distance.

In the preferred embodiment, each of the photosensors 50 and 52 is a photosensitive resistor formed of type 4 material (modified cadmium selenide) having a peak response at 6800 angstroms. A photosensitive resistor meeting these specifications is commercially available from Vactec and identified as number VT74L.

Each of the photosensors 50 and 52 is contained within an integral wall defined by a set of semicircular wall sections 54a and b and 56a and b, respectively. The integral wall sections secure the photosensors 50 and 52 in their mounted positions.

Photosensor 50 is communicated to bus terminals 44b and d through a pair of connector leads 58a and b, respectively. Photosensor 52 is communicated to bus terminals 44c and d through connector leads 60a and b, respectively. A set of heat stakes 62 is provided to secure leads 58a and b in position. Similarly, heat stakes 64 perform the same function for leads 60a and b.

It should be noted that the exact position of the light source 24 relative to the photosensors 50 and 52 on the support plate 22 is not critical. What is important, however, is the requirement that the light source and photosensors be in opposing relation to one another and spaced apart at less than or greater than one-half of the inner circumference to the tubular casing 16 when the sensor 20 is mounted in the shock absorber. This point will be made apparent in the subsequent description of the operation of the invention.

With reference now to both FIGS. 3 and 4, the rear surface of the support plate 22 has formed on it an integral connector head 66. The connector head 66 comprises a lower cylindrical base segment 68, a central cylindrical segment 70 having a reduced diameter with respect to segment 68, and an upper cylindrical segment 72. The top surface of upper segment 72 contains the four bus terminals 44a, b, c, and d. The central segment is adapted to receive a conventional push-on fastener 74 in the form of a snap-ring. The connector head 66 is adapted to mate with a male connected plug to transmit signals from the level sensor 20.

With particular reference now to FIG. 4, the level sensor 20 is shown mounted in position on the interior wall of the tubular casing 16. The support plate 22 is stressed into a curvilinear profile to conform to the shape of the inner wall of the tubular casing 16. The connector head is inserted through a bore in the wall of the casing and locked in position by the push-on fastener 74. A particular advantage of the connector head 66 is that it allows precise mounting of the level sensor 20 by the drilling of a single hole in the wall of the tubular casing 16. The casing 16 is sealed at the hole by the confirmity of the support plate 22 to the interior wall of the casing. An adhesive sealant compound may be used between the rear surface of the support plae 22 and the interior wall of tubular casing 16 to supplement the seal.

Referring now to FIG. 1, the operation of the level sensor 20 will next be described. In the preferred embodiment, the level sensor 20 is sensitive to the relative axial position of the fluid reserve tube 19. The reserve tube receives fluid forced by a piston through an orifice in the cylinder of the piston-cylinder arrangement 18. When the shock absorber 10 experiences relatively light loading, the volume within the closed tubular casing 16 will increase in proportion to the increase in the axial dimension of the volume. Conversely, when the shock absorber 10 experiences a relatively heavy load, the volume within the tubular casing 16 will decrease in proportion to the decrease in the axial dimension of the volume.

One may be empirical analysis prescribe a range of positions of the fluid reserve tube relative to a point on the wall of the tubular casing 16 that define a permissible range of vehicle axle-to-body distances. This range of positions further defines the position at which the level sensor 20 is to be mounted within the tubular casing 16. More specifically, the level sensor 20 will be mounted such that the fluid reserve tube will interrupt the light path between the light source 24 and photosensor 52, and leave unaffected the path of light communication between the light source and photosensor 50 when the relative position of the fluid reserve tube is within the permissible range of values.

However, when the fluid reserve tube blocks or interrupts the light path between the light source 24 and both photosensors 50 and 52, as is represented by the upper set of phantom lines in FIG. 1, it will indicate an overload condition. Conversely, when the fluid reserve tube 19 leaves uninterrupted the light paths between the source and photosensors, as is represented by the lower set of phantom lines, it will indicate an underload condition.

The three various signal conditions can be received as input and interpreted by a control circuit. If an overload condition exists, the control circuit can enable an air pump to increase the air pressure within the tubular casing 16. If an underload condition exists, the control circuit can actuate a solenoid or similar type device to exhaust air from within the tubular casing 16. A control circuit suitable for use with level sensor 20 of the present invention is disclosed in the above-identified copending application Ser. No. 860,020.

The foregoing disclosure of the invention in a specific embodiment is intended to be illustrative only. The invention is adaptable to a number of varying embodiments without departing from the scope or spirit of the appended claims.

The embodiments of the invention in which an exclusive property or privilege is claimed are defined as follows:

1. For use in a load-leveling shock absorber of the class having a tubular housing member enclosing an air chamber and a movable member mounted within the housing member and adapted for relative motion along the axis thereof in response to changes in load value, an improved load sensor for detecting the level of the movable member relative to a permissible range of levels comprising: a support base formed of resilient material adapted to be received within the tubular member in conformity with the inner wall thereof; light source means, mounted on the support base proximate one end of its lateral dimension, for providing a source of light energy; first and second photosensitive means, each mounted on the support base proximate the other end of its lateral dimension and spaced from one another in transverse relation to the lateral dimension, the first and second photosensitive means respectively defining upper and lower bounds of the permissible range of levels, and each being responsive to an interruption of incident light energy from the light source means, caused by the interposition of the movable member, to produce a signal representative thereof.

2. The invention as defined in claim 1 further comprising connector head means for mounting the load sensor to the tubular housing member with a secure pneumatic seal, and further for electrically communicating the light source means and first and second photosensitive means to the environment external of the shock absorber, the connector head means being formed integrally with the base member and insertable through a bore in the tubular housing member.

3. The invention as defined in claim 1, wherein the light source means comprises a light emitting diode, and the first and second photosensitive means comprise photoresistors.

4. The invention as defined in claim 3, wherein the light emitting diode has a wavelength of approximately 6600 angstroms, and the photoresistors are formed of modified cadmium selenide.

5. The invention as defined in claim 1, wherein the support base is defined by a relatively thin plate of resilient material to afford clearance for the relative motion of the movable member with respect to the tubular housing member.

6. The invention as defined in claim 5, wherein the support plate is formed of nylon.

7. The invention as defined in claim 6, wherein the support plate includes heat stake means for securing in place electrical connector leads associated with the light source and first and second photosensitive means.

* * * * *

Disclaimer 4,150,299.—*Stanley J. Kasiewicz*, Southfield, Mich. and *James R. Van Sickle*, New Baltimore, Mich. LEVEL SENSOR FOR AN AIR-SPRING SHOCK ABSORBER. Patent dated Apr. 17, 1979. Disclaimer filed June 2, 1980, by the inventor.

Hereby enters this disclaimer to entire term of said patent.

[*Official Gazette July 29, 1980.*]